Oct. 15, 1957  C. H. MILLERWISE  2,810,045
THERMOSTAT
Filed Feb. 7, 1956  3 Sheets-Sheet 1
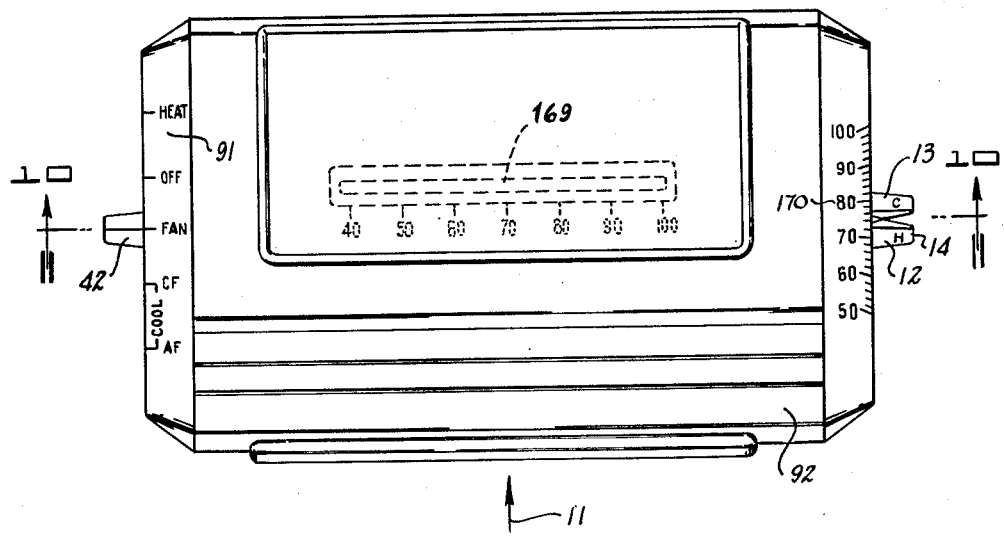
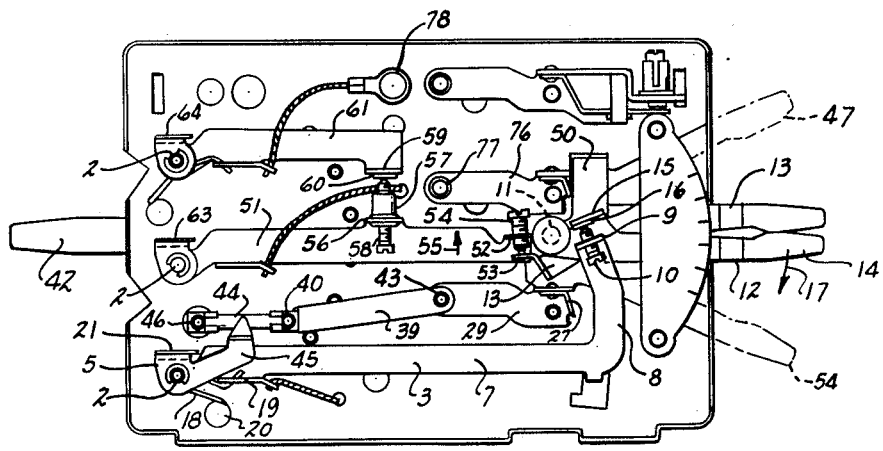
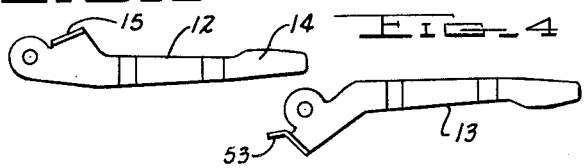
INVENTOR.
CARL H. MILLERWISE
BY
SMITH, OLSEN & KOTTS
ATTORNEYS

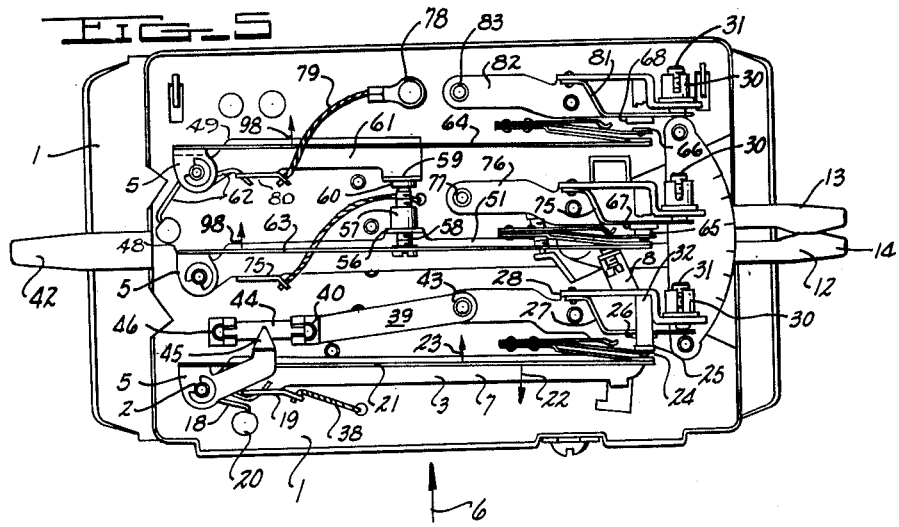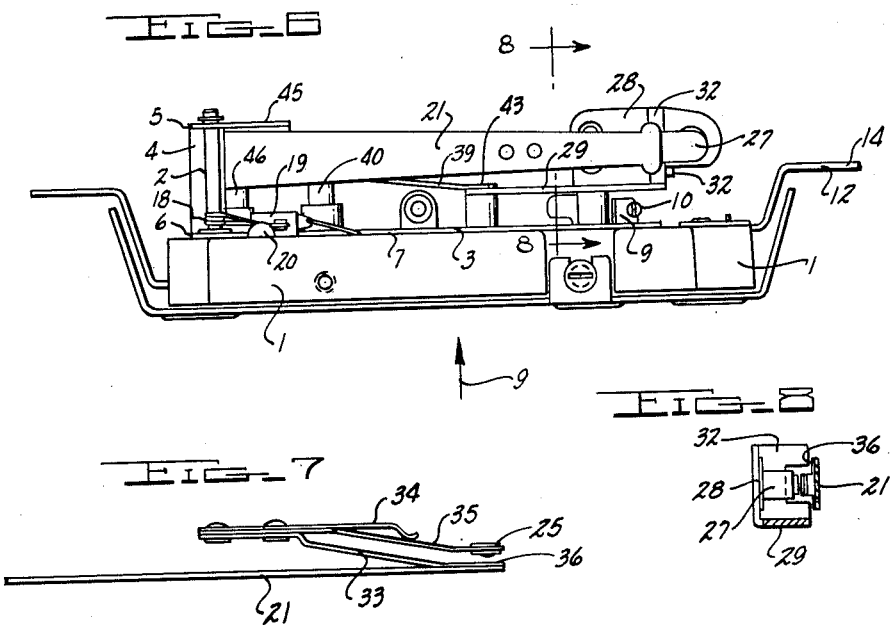

Oct. 15, 1957 C. H. MILLERWISE 2,810,045
THERMOSTAT
Filed Feb. 7, 1956 3 Sheets-Sheet 3
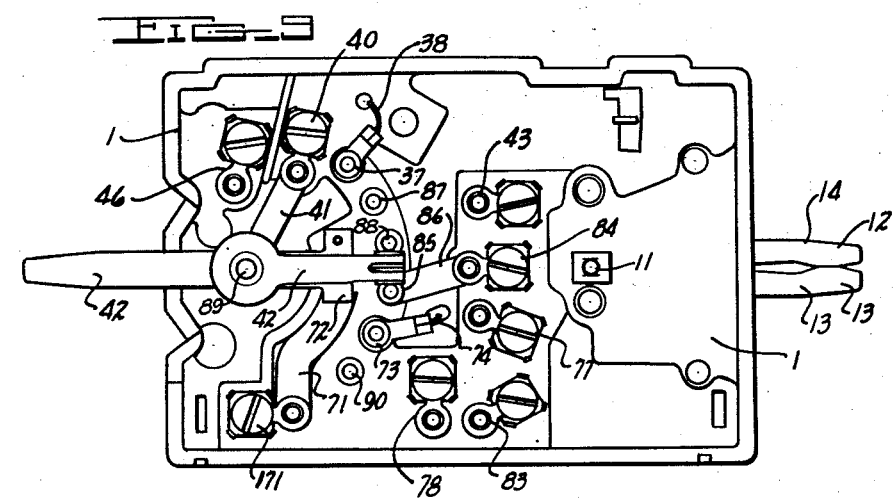
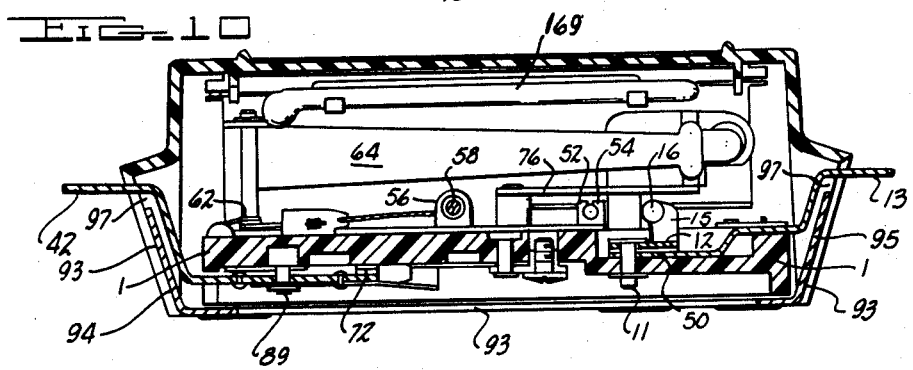
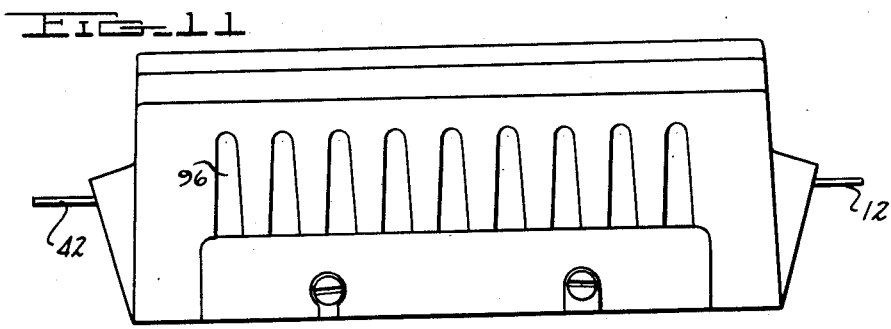
INVENTOR.
CARL H. MILLERWISE
BY
SMITH, OLSEN & KOTTS
ATTORNEYS United States Patent Office 2,810,045
Patented Oct. 15, 1957

2,810,045

THERMOSTAT

Carl Herman Millerwise, Trumbull, Conn., assignor to Detroit Controls Corporation, Detroit, Mich., a corporation of Michigan Application February 7, 1956, Serial No. 563,997

16 Claims. (Cl. 200—138)

This invention relates to a thermostat for controlling the operation of a room air heater and room air cooler.

It is customary to control room air heaters and room air coolers by a thermostat. The thermostat includes a switch and temperature responsive power element. When a thermostat is employed to control a heater, decrease in room temperature causes the power element to actuate the thermostat switch and thereby force the heater to supply the room with warmer air. When a thermostat is employed to control a cooler, increase in room temperature causes the power element to actuate the thermostat switch and thereby force the cooler to supply the room with cool air.

It is necessary that one element control the heater and another element or plurality of elements control the cooler. However cost savings and ease of operation advantages can be obtained by employing the various temperature responsive elements in a single thermostat construction.

In connection with control of the cooler it has been discovered that the most efficient cooling is obtained when the rate of cooled air delivery to the room is proportional to the difference between the room temperature and desired temperature. For example, on a very hot day when the room temperature tends to be relatively high it is desirable that the cooler have a comparatively high rate of cool air delivery to the room. On a cooler day when the room temperature tends to be somewhat lower it is desirable that the cooler deliver cold air to the room at a comparatively low rate.

The rate of cool air delivery can be varied in different ways, as by providing a by pass line around the cooler compressor and opening the by pass line during periods when it is desired to operate at low rates of cool air delivery. The rate of cool air delivery can also be varied by employing two compressor stages during periods of high cool air delivery and a single compressor stage during periods of low cool air delivery.

Whatever method of varying the cool air delivery rate is employed it is necessary that the thermostat be of such construction as to automatically control the rate of cooling action in accordance with the difference between the room temperature and thermostat setting.

Under the present invention two separate temperature responsive power elements are employed to control the rate of cool air delivery. When it is desired to operate at low rates of cool air delivery only one of the power elements is moved to a switch-actuating position. When it is desired to operate at higher rates of cool air delivery both of the power elements are moved to switch-actuating positions. The thermostat construction is such that the position of each temperature responsive element relative to its switch is automatically controlled by the difference between the room temperature and thermostat temperature setting, irrespective of the room temperature alone. As a result the air cooler mechanism can be efficiently operated to cool the room to any of several different temperatures in accordance with the desires of the room occupants.

Objects of the invention are to:

(1) Provide a thermostat for controlling the operation of a cooler, wherein the rate of cool air delivery can be varied in accordance with the difference between room temperature and thermostat setting.

(2) Provide a cooling thermostat wherein control of the cool air delivery rate can be effected without any manual adjustment other than adjusting the thermostat to the desired temperature setting, (3) Provide a thermostat including two separate switches; wherein one switch is actuated when the difference in room temperature and thermostat setting reaches one value, and both switches are actuated when said difference reaches a different value, (4) Provide a single manually operable mechanism for actuating both of the above-mentioned switches in the desired sequence, (5) Provide a simply constructed thermostat which is capable of controlling both a heater and cooler, and (6) Provide a heating and cooling thermostat which may be switched from winter operation to summer operation by a single manual adjustment.

Other objects of this invention will appear in the following description and appended claims, reference being had to the accompanying drawings forming a part of this specification wherein like reference characters designate corresponding parts in the several views.

In the drawings:

Fig. 1 is a front view of one embodiment of the invention,

Fig. 2 is a view taken in the same direction as Fig. 1 but with a cover element and certain of the thermostat mechanisms removed for illustration purposes, Fig. 3 is a view of an adjusting lever employed in the Fig. 1 construction, Fig. 4 is a view of another adjusting lever employed in the Fig. 1 construction, Fig. 5 is a view taken in the same direction as Fig. 2 but with only the cover element removed, Fig. 6 is a view taken in the direction of arrow 6 in Fig. 5, Fig. 7 is a view of a multi-metallic element and switch contact employed in the Fig. 1 construction, Fig. 8 is a fragmentary sectional view on line 8—8 in Fig. 6, Fig. 9 is a view taken in the direction of arrow 9 in Fig. 6, Fig. 10 is a sectional view in the direction of line 10—10 in Fig. 1, and Fig. 11 is an exterior view in the direction of arrow 11 in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a support body 1 formed of dielectric material. A brass pin 2 fixedly projects from body 1, and a metal arm 3 is mounted for rotary movement around pin 2. Arm 3 includes a web portion 4 and two ear portions 5 and 6 whereby to mount it for rotary movement around pin 2. Extending integrally from ear portion 6 is an arm portion 7 (Fig. 2) having a turned end portion 8. The extreme end of portion 8 is turned up to provide an ear 9, and a screw 10 is threaded through ear 9.

A headed pin 11 (Fig. 9) fixedly extends through body 1, and two manually operated levers 12 and 13 are mounted for rotary movement around the axis of pin 11. A nylon guide plate 50 is fixedly positioned between levers 13 and 12 to permit independent movement of each plate. Lever 12 includes a manually engageable portion 14, and an upstanding ear portion 15 in registry with screw 10. A fiber disk 16 is secured on ear portion 15 to electrically isolate lever 12 from arm 3. It will be appreciated from a study of Fig. 2 that manual movement of lever 12 in the direction of arrow 17 will cause arm 3 to move around pin 2 in a clockwise direction. In order to hold screw 10 against disk 16 there is provided a wire spring 18. Spring 18 coils around pin 2 and has one of its ends anchored in ear 19 formed integrally with arm portion 7. The other end of spring 18 is anchored in a projecting portion 20 of support body 1. The end portions of spring 18 tend to spread apart so as to urge arm 3 toward ear 15.

There is carried by web portion 4 a multi-metallic blade 21, which on temperature increase flexes in the direction of arrow 22. On temperature decrease blade 21 tends to flex in the direction of arrow 23. Blade 21 serves as a temperature responsive power element for opening and closing a switch 24 (Fig. 5). Switch 24 includes a contact element 25 indirectly carried by blade 21 and a registering contact element 26 carried by an arm 27. Arm 27 is cantileverly attached on the upstanding ear portion 28 of a metal bracket 29. An internally threaded barrel 30 is affixed to ear portion 28, and a screw 31 threads through barrel 30 into pressure engagement with arm 27. A permanent magnet 32 is fixedly positioned on ear portion 28, and adjustment of screw 31 in barrel 30 serves to vary the position of contact element 26 relative to magnet 32.

The mechanism for mounting contact element 25 on blade 21 includes two relatively rigid arms 33 and 34, and a flexible resilient arm 35. Arms 33 and 34 serve as stop members to limit flexing movement of arm 35. The natural tendency of arm 35 is to assume its Fig. 7 position. End portion 36 of arm 35 is in registry with the poles of magnet 32, and as blade 21 moves toward the magnet end portion 36 is moved quickly toward the magnet poles with a snapping action so as to put contact elements 25 and 26 into firm electrical engagement with each other. The position of screw 31 in barrel 30 determines the amount or intensity of the magnetic force on end portion 36. Screw 31 should be so adjusted in barrel 30 that the magnetic force on end portion 36 is just sufficient to hold contacts 25 and 26 in firm electrical engagement without unduly hindering contact disengagement and movement of element 21 in the arrow 22 direction during temperature increase.

When the thermostat is installed and contacts 25 and 26 are engaged current flows through terminal 40 (Fig. 9), conductor strip 41, movable selector arm 42, contact button 37, conductor 38 (Figs. 9 and 5), ears 19 and 6, web portion 4, element 21, arms 33 and 35, contacts 25 and 26, arm 27, bracket 29, and terminals 43 (Figs. 5 and 6).

The temperature at which contacts 25 and 26 close is determined by the position of lever 12. Movement of lever 12 from the Fig. 2 position in the arrow 17 direction causes element 21 to move away from contact 26 and thereby decreases the temperature at which contacts 25 and 26 close. Movement of lever 12 in the opposite direction causes element 21 to move toward contact 26 and thereby increases the temperature at which contacts 25 and 26 close. When lever 12 is being used lever 13 is preferably shifted to its dotted line position 47 (Fig. 2) so as not to interfere with easy manual movement of lever 12.

In order to increase the time response characteristics of element 21 to room temperature change there is employed a heater element 44. Element 21 receives heat by convection from element 44, but an extension 45 is provided on ear 5 to also collect heat from element 44 and transfer it by conduction to element 21. Element 44 is connected in parallel with switch 24. Current for element 44 flows from terminal 46 (Fig. 9), through element 44, conductor strip 39, and terminal 43.

The thermostat mechanism formed by terminals 40, 43 and 46, switch 24, power element 21 and heater element 44 serves to control the operation of a furnace (not shown) during the winter months. In order to control the operation of an air cooler unit during the summer months there are provided two other thermostat mechanisms, indicated generally by reference numerals 48 and 49. These thermostat mechanisms employ certain of the same structural elements as the heating thermostat, and similar reference numerals are employed wherever applicable. However certain of the similarly formed structural elements are given different reference numerals for purposes of distinguishing one particular element from another.

Thermostat mechanism 48 includes a metal arm 51 pivotally mounted on a pin 2. Arm 51 is provided with an upstanding ear 52 in registry with an upstanding ear 53 on lever 13. A screw 54 is threaded through ear 52 into pressure engagement with ear 53. When lever 12 is in its dotted line position 54 movement of lever 13 in the arrow 17 direction is effective to move arm 51 in the direction of arrow 55 (Fig. 2). Arm 51 is provided with an ear 56, which fixedly mounts an internally threaded barrel 57. A screw 58 is threaded through barrel 57 into pressure engagement with a fiber disk 60 affixed to an ear 59. Ear 59 extends from an arm 61 which is mounted for pivotal movement around its own pin 2. Elements 56 through 60 function as a mechanism for translating motion of arm 51 into motion of arm 61. A coil spring 62 acts on arm 61 to hold disk 60 in pressure engagement with screw 58.

Arms 51 and 61 carry multi-metallic blades 63 and 64, respectively, which move in the arrow 98 directions during temperature increases. These blades carry contact elements 65 and 66 which register with contacts 67 and 68 carried by arms 69 and 70. Magnets are provided for holding the contacts in firm electrical engagement. The spacing between contacts 65 and 67 is less than the spacing between contacts 66 and 68. As a result, when lever 13 is moved in the arrow 17 direction contacts 65 and 67 will close before contacts 66 and 68. In operation, when the room temperature (as indicated by thermometer 169) is but a few degrees above the desired temperature setting as indicated by lever 14 and indicia 170 (Fig. 1) only contacts 65 and 67 will be closed. If the room temperature is more than a few degrees above the desired temperature setting contacts 65, 67 and contacts 66, 68 will be closed.

The circuit controlled by contacts 65 and 67 includes terminal 171 (Fig. 9), conductor strip 71, slider 72, selector arm 42, contact button 73, conductor 74, ear 75 (Fig. 5), arm 51, power element 63, contacts 65 and 67, arm 75, bracket 76 and terminal 77.

The circuit controlled by contacts 66 and 68 includes terminal 78, conductor 79, ear 80, arm 61, blade 64, contacts 66 and 68, arm 81, bracket 82 and terminal 83.

When arm 42 is engaged with button 73 and contacts 65, 67 are closed a cooler mechanism (not shown) delivers relatively small quantities of cool air to the room. When contacts 66 and 68 are also closed the cooler mechanism delivers larger quantities of cool air to the room. The rate of cool air delivery is determined by the difference between room temperature and the temperature setting of lever 13. When this difference is large (and the need for cool air at a maximum) the cool air delivery is relatively high. When this temperature difference is small the cool air delivery is relatively low.

Preferably the thermostat construction includes a terminal 84 for a fan (not shown). The fan operates in conjunction with the cooler mechanism or alone, depending on the adjusted position of arm 42. When arm 42 contacts a button 85 current flows through terminal 171, conductor strip 71, slider 72, arm 42, button 85, conductor strip 86, and terminal 84 to energize the fan.

During winter operation arm 42 is positioned between buttons 37 and 87 whereby switch 24 can control the operation of the room heater in accordance with the position of lever 12.

The mechanism can be shifted to an off position by rotating arm 42 around shaft 89 to a position between buttons 87 and 88.

Further rotation of arm 42 to a position between buttons 88 and 85 causes the aforementioned fan to operate alone as an air circulator medium, without any air heating or cooling.

Continued rotation of arm 42 to a position between buttons 85 and 73 causes the fan to operate in conjunction with the air cooler mechanism to circulate cool air to the room.

Further rotation of arm 42 to a position between buttons 73 and 90 causes the air cooler mechanism to operate alone, without any forced circulation by the fan.

It will be understood that the button spacing is such that arm 42 makes contact with both of the two buttons between which it may be positioned.

A cover 92 is positioned over the thermostat mechanisms, and indicia 91 is provided on the cover to permit visual indication of the arm 42 position. A bracket 93 permits mounting of the thermostat mechanism on the room wall. End portions 94 and 95 of the bracket shield the interior thermostat mechanisms from view and inadvertent damage. Openings 96 in cover 92 and openings 97 between the cover and bracket 93 permit air circulation around the switch blades.

I claim:

1. A thermostat comprising a support mechanism; first and second temperature responsive elements mounted on said support mechanism; a switch contact carried by each of said temperature responsive elements; a second switch contact in registry with each of said first switch contacts; manually actuable mechanism mounted on said support mechanism and operatively engaged with said first temperature responsive element for moving said first element and the contact carried thereby toward and away from its registering contact; and mechanism for causing said second element and the contact carried thereby to move toward and away from its registering contact in response to corresponding movement of said first element; the spacing between one set of contacts being different than the spacing between the other set of contacts whereby said other set of contacts is closed before said one set of contacts.

2. A thermostat comprising a support mechanism; first and second temperature responsive elements mounted on said support mechanism; a switch contact carried by each of said temperature responsive elements; a second switch contact in registry with each of said first switch contacts; a manually actuable mechanism mounted on said support mechanism and operatively engaged with said first temperature responsive element for moving said first element and the contact carried thereby toward and away from its registering contact; and mechanism for causing said second element and the contact carried thereby to move toward and away from its registering contact in response to corresponding movement of said first element; the spacing between one set of contacts being different than the spacing between the other set of contacts whereby said other set of contacts is closed before said one set of contacts.

3. A thermostat comprising a support mechanism; first and second arms pivotally mounted on said support mechanism; first and second temperature responsive elements carried by respective ones of said arms; a switch contact carried by each of said elements; a second switch contact in registry with each of said first switch contacts; a manually actuable lever pivotally mounted on said support mechanism and operatively engaged with said first arm for moving said first element and the contact carried thereby toward and away from its registering contact; and mechanism between said arms for causing said second element and the contact carried thereby to move toward and away from its registering contact in response to corresponding movement of said first element; the spacing between one set of contacts being different than the spacing between the other set of contacts whereby said other set of contacts is closed before said one set of contacts.

4. A thermostat comprising a support mechanism; first and second arms movably mounted on said support mechanism; first and second temperature responsive elements carried by respective ones of said arms; a switch contact carried by each of said elements; a second switch contact in registry with each of said first switch contacts; manually actuable mechanism mounted on said support mechanism and operatively engaged with said first arm for moving said first element and the contact carried thereby toward and away from its registering contact; and mechanism for causing said second element and the contact carried thereby to move toward and away from its registering contact in response to corresponding movement of said first element; the spacing between one set of contacts being different than the spacing between the other set of contacts whereby said other set of contacts is closed before said one set of contacts.

5. A thermostat comprising a support mechanism; first and second arms pivotally mounted on said support mechanism; first and second temperature responsive elements carried by respective ones of said arms; a switch contact carried by each of said elements; a second switch contact in registry with each of said first switch contacts; a manually actuable lever pivotally mounted on said support mechanism and operatively engaged with said first arm for moving said first element and the contact carried thereby toward and away from its registering contact; and mechanism for causing said second element and the contact carried thereby to move toward and away from its registering contact in response to corresponding movement of said first element; the spacing between one set of contacts being different than the spacing between the other set of contacts whereby said other set of contacts is closed before said one set of contacts.

6. A thermostat comprising a support mechanism; first and second temperature responsive elements pivotally mounted on said support mechanism; a switch contact mounted for movement with each of said elements; a second switch contact in registry with each of said first switch contacts; a manually actuable lever pivotally mounted on said support mechanism and operatively engaged with said first element for moving said first element and its contact toward and away from its registering contact; and mechanism between the elements for causing said second element and its contact to move toward and away from its registering contact in response to corresponding movement of said first element; the spacing between one set of contacts being different than the spacing between the other set of contacts whereby said other set of contacts is closed before said one set of contacts.

7. A thermostat comprising a support mechanism; first and second temperature responsive elements mounted on said support mechanism; a switch contact mounted for movement with each of said elements; a second switch contact in registry with each of said first switch contacts; manually actuable mechanism mounted on said support mechanism and operatively engaged with said first element for moving said first element and its contact toward and away from its registering contact; and mechanism for causing said second element and its contact to move toward and away from its registering contact in response to corresponding movement of said first element; the spacing between one set of contacts being different than the spacing between the other set of contacts whereby said other set of contacts is closed before said one set of contacts.

8. A thermostat comprising a support mechanism; first and second temperature responsive elements pivotally mounted on said support mechanism; a switch contact mounted for movement with each of said elements; a second switch contact in registry with each of said first switch contacts; a manually actuable lever pivotally mounted on said support mechanism and operatively engaged with said first element for moving said first element and its contact toward and away from its registering contact; and mechanism for causing said second element and its contact to move toward and away from its registering contact in response to corresponding movement of said first element; the spacing between one set of contacts being different than the spacing between the other set of contacts whereby said other set of contacts is closed before said one set of contacts.

9. A thermostat comprising a support mechanism; first, second and third temperature responsive elements pivotally mounted on said support mechanism; a switch contact mounted for movement with each of said temperature responsive elements; a second switch contact in registry with each of said first switch contacts; a manually actuable lever pivotally mounted on said support mechanism and operatively engaged with said first temperature responsive element for moving said first element and its contact toward and away from its registering contact; mechanism between the first and second temperature responsive elements for causing said second element and its contact to move toward and away from its registering contact in response to corresponding movement of said first element; and a second manually actuable lever pivotally mounted on said support mechanism around the same axis as said first lever and operatively engaged with said third element for moving said third element and its contact toward and away from its registering contact.

10. A thermostat comprising a support mechanism; first, second and third temperature responsive elements mounted on said support mechanism; a switch contact mounted for movement with each of said temperature responsive elements; a second switch contact in registry with each of said first switch contacts; manually actuable mechanism mounted on said support mechanism and operatively engaged with said first temperature responsive element for moving said first element and its contact toward and away from its registering contact; mechanism for causing said second element and its contact to move toward and away from its registering contact in response to corresponding movement of said first element; and a second manually actuable lever pivotally mounted on said support mechanism and operatively engaged with said third element for moving said third element and its contact toward and away from its registering contact.

11. A thermostat comprising a support mechanism; first, second and third temperature responsive elements mounted on said support mechanism; a switch contact mounted for movement with each of said temperature responsive elements; a second switch contact in registry with each of said first switch contacts; a manually actuable lever pivotally mounted on said support mechanism and operatively engaged with said first temperature responsive element for moving said first element and its contact toward and away from its registering contact; mechanism between the first and second temperature responsive elements for causing said second element and its contact to move toward and away from its registering contact in response to corresponding movement of said first element; and a second manually actuable lever pivotally mounted on said support mechanism and operatively engaged with said third element for moving said third element and its contact toward and away from its registering contact.

12. A thermostat comprising a support mechanism; first and second temperature responsive elements pivotally mounted on said support mechanism; a switch contact mounted for movement with each of said temperature responsive elements; a second switch contact in registry with each of said first switch contacts; a manually actuable lever mounted on said support mechanism for varying the spacing between the first element contact and its registering contact; and means responsive to movement of said lever for varying the spacing between the second element contact and its registering contact; the spacing between one set of contacts being different than the spacing between the other set of contacts whereby said other set of contacts is closed before said one set of contacts.

13. A thermostat comprising a support mechanism; first and second temperature responsive elements mounted on said support mechanism; a switch contact mounted for movement with each of said temperature responsive elements; a second switch contact in registry with each of said first switch contacts; mechanism mounted on said support mechanism for varying the spacing between the first element contact and its registering contact; and means responsive to movement of said mechanism for varying the spacing between the second element contact and its registering contact; the spacing between one set of contacts being different than the spacing between the other set of contacts whereby said other set of contacts is closed before said one set of contacts.

14. A thermostat comprising a support mechanism; first and second temperature responsive elements mounted on said support mechanism; a switch contact mounted for movement with each of said temperature responsive elements; a second switch contact in registry with each of said first switch contacts; a first manually actuable lever pivotally mounted on said support mechanism for varying the spacing between the first element contact and its registering contact; a second manually actuable lever pivotally mounted on the same pivot as said first lever for varying the spacing between the second element contact and its registering contact; terminal means on the support mechanism for each set of contacts; and a third manually actuable lever pivotally mounted on said support mechanism for alternately connecting each terminal means with its respective set of contacts.

15. A thermostat comprising a support mechanism; first and second temperature responsive elements mounted on said support mechanism; a switch contact mounted for movement with each of said temperature responsive elements; a second switch contact in registry with each of said first switch contacts; first manually actuable means movably mounted on said support mechanism for varying the spacing between the first element contact and its registering contact; second manually actuable means movably mounted on the support mechanism for varying the spacing between the second element contact and its registering contact; terminal means on the support mechanism for each set of contacts; and third manually actuable means movably mounted on said support mechanism for alternately connecting each terminal means with its respective set of contacts.

16. A thermostat comprising first and second switch means; means responsive to temperature change for actuating said switch means; and manually operable means for automatically varying the switch means position whereby to actuate said switch means sequentially.

References Cited in the file of this patent

UNITED STATES PATENTS

| | | |
|---|---|---|
| Re. 14,286 | Mann | Apr. 17, 1917 |
| 2,611,070 | Chandler | Sept. 16, 1952 |
| 2,621,856 | Smith | Dec. 16, 1952 |
| 2,624,030 | Swan | Dec. 30, 1952 |